United States Patent
Kashiwagi et al.

(10) Patent No.: US 7,737,194 B2
(45) Date of Patent: *Jun. 15, 2010

(54) SILICONE LENS AND SILICONE RESIN COMPOSITION FOR MOLDING LENS

(75) Inventors: Tsutomu Kashiwagi, Annaka (JP); Toshio Shiobara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 454 days.

This patent is subject to a terminal disclaimer.

(21) Appl. No.: 11/785,791

(22) Filed: Apr. 20, 2007

(65) Prior Publication Data

US 2007/0249790 A1 Oct. 25, 2007

(30) Foreign Application Priority Data

Apr. 24, 2006 (JP) ............................ 2006-119055

(51) Int. Cl.
*C08L 83/04* (2006.01)

(52) U.S. Cl. ...................... 523/107; 525/477; 525/478; 525/479; 528/15; 528/31; 528/32

(58) Field of Classification Search ........................ None
See application file for complete search history.

(56) References Cited

U.S. PATENT DOCUMENTS

| 3,840,393 | A | * | 10/1974 | Ishizaka et al. | .......... | 427/208.4 |
| RE34,027 | E | * | 8/1992 | Nakamura et al. | ......... | 428/35.8 |
| 5,258,433 | A | * | 11/1993 | Meier et al. | ................. | 524/155 |
| 5,764,181 | A | * | 6/1998 | Fey et al. | ........................ | 342/4 |
| 6,285,513 | B1 | | 9/2001 | Tsuji et al. | | |
| 7,553,915 | B2 | * | 6/2009 | Kashiwagi | ................. | 525/477 |

FOREIGN PATENT DOCUMENTS

| EP | 568 318 | * 11/1993 |
| JP | 2000-231002 A | 8/2000 |
| JP | 2004-221308 A | 8/2004 |

\* cited by examiner

*Primary Examiner*—Marc S Zimmer
(74) *Attorney, Agent, or Firm*—Westerman, Hattori, Daniels & Adrian, LLP

(57) ABSTRACT

A colorless transparent silicone lens produced by thermally curing a silicone resin composition comprising
(A) an organopolysiloxane having a resin structure comprising $R^1SiO_{1.5}$ unit, $R^2_2SiO$ unit, and $R^3_aR^4_bSiO_{(4-a-b)/2}$ unit wherein $R^1$, $R^2$, and $R^3$ are independently methyl group, ethyl group, propyl group, cyclohexyl group, or phenyl group, $R^4$ is vinyl group or allyl group, a is 0, 1, or 2, b is 1 or 2, and a+b is 2 or 3, and wherein number of repetition of the $R^2_2SiO$ unit is 5 to 300,
(B) an organohydrogen polysiloxane having a resin structure comprising $R^1SiO_{1.5}$ unit, $R^2_2SiO$ unit, and $R^3_cH_dSiO_{(4-c-d)/2}$ unit wherein c is 0, 1, or 2, d is 1 or 2, and c+d is 2 or 3, and wherein number of repetition of the $R^2_2SiO$ unit is 5 to 300, the component, and
(C) a platinum group catalyst.

A silicone lens having excellent flexibility, transparency, and moldability as well as reduced surface tackiness is provided.

4 Claims, 1 Drawing Sheet

A WEIGHT OF 3g

US 7,737,194 B2

SILICONE LENS AND SILICONE RESIN COMPOSITION FOR MOLDING LENS

CROSS-REFERENCE TO RELATED APPLICATION

This non-provisional application claims priority under 35 U.S.C. §119(a) on Patent Application No. 2006-119055 filed in Japan on Apr. 24, 2006, the entire contents of which are hereby incorporated by reference.

TECHNICAL FIELD

This invention relates to a silicone lens, and an addition curing silicone resin which is well adapted for use in producing such a lens. More specifically, this invention relates to a silicone lens which has high transparency and moldability, no surface tackiness, and excellent impact strength, and a silicone resin composition for molding such a lens.

BACKGROUND OF THE INVENTION

Lens used in LED light emitting device is mass-produced by mechanical molding such as injection molding. Such lens has been produced by a thermoplastic resin such as acrylic resin or polycarbonate resin. However, introduction of the LED light emitting device that operates at a higher power has raised the problem that the lens made of a thermoplastic resin is insufficient in resistance to heat and color change.

Recently, lead free solder is widely used. Lead free solder, however, melts at a temperature higher than the conventional solder, and typically, a temperature of 260° C. or higher is used for the soldering of the optical device to the substrate. When the soldering is conducted at such temperature, conventional thermoplastic lens experiences problems such as deformation and yellowing by the high temperature, and use of the lens becomes impossible.

In view of such situation, use of a silicone resin for the lens of LED and the like has been considered in many cases. However, in the case of a lens having a hollow structure, the lens formed from the conventional hard silicone lens material suffer from insufficiency in the impact strength while the lens formed from a soft rubber suffer from deformation which results in the loss of optical properties and stress on the interior LED chip, wire, and the like.

Such prior arts are JP-A 2000-231002 corresponding to U.S. Pat. No. 6,285,513 and JP-A 2004-221308.

SUMMARY OF THE INVENTION

In view of the situation as described above, an object of the present invention is to overcome the drawbacks of the prior art and provide a transparent silicone lens which has high impact strength which is not damaged in the drop test commonly used for testing various devices, and which also has little surface tackiness. Another object of the present invention is to provide a silicone resin composition for producing such a silicone lens.

The inventors of the present invention made an intensive study to realize the objects as described above, and found that when an addition curing silicone composition is produced by using (A) an organopolysiloxane having a resin structure comprising $R^1SiO_{1.5}$ unit, $R^2{}_2SiO$ unit, and $R^3{}_aR^4{}_bSiO_{(4-a-b)/2}$ unit wherein $R^1$, $R^2$, and $R^3$ are independently methyl group, ethyl group, propyl group, cyclohexyl group, or phenyl group, $R^4$ is vinyl group or allyl group, a is 0, 1, or 2, b is 1 or 2, and a+b is 2 or 3, and wherein number of repetition of the $R^2{}_2SiO$ unit is 5 to 300 is used as an alkenyl group-containing organopolysiloxane; simultaneously with (B) an organohydrogen polysiloxane having a resin structure comprising $R^1SiO_{1.5}$ unit, $R^2{}_2SiO$ unit, and $R^3{}_cH_dSiO_{(4-c-d)/2}$ unit wherein $R^1$, $R^2$, and $R^3$ are as described above, c is 0, 1, or 2, d is 1 or 2, c+d is 2 or 3, and wherein number of repetition of the $R^2{}_2SiO$ unit is 5 to 300 used as an organohydrogen polysiloxane; the silicone composition can be produced into a lens having an excellent flexibility despite being a hard resin; the composition has high transparency and high moldability; the cured product has little surface tackiness; the composition can be readily molded in conventional molding machines; and therefore, the composition is well adapted as a material for molding a lens. The present invention has been completed on the bases of such findings.

Accordingly, the present invention provides a silicone lens and a silicone resin composition for molding such a resin as described below.

[1] A colorless transparent silicone lens produced by thermally curing a silicone resin composition comprising (A) an organopolysiloxane having a resin structure comprising $R^1SiO_{1.5}$ unit, $R^2{}_2SiO$ unit, and $R^3{}_aR^4{}_bSiO_{(4-a-b)/2}$ unit wherein $R^1$, $R^2$, and $R^3$ are independently methyl group, ethyl group, propyl group, cyclohexyl group, or phenyl group, $R^4$ is vinyl group or allyl group, a is 0, 1, or 2, b is 1 or 2, and a+b is 2 or 3, and wherein number of repetition of the $R^2{}_2SiO$ unit is 5 to 300, (B) an organohydrogen polysiloxane having a resin structure comprising $R^1SiO_{1.5}$ unit, $R^2{}_2SiO$ unit, and $R^3{}_cH_dSiO_{(4-c-d)/2}$ unit wherein $R^1$, $R^2$, and $R^3$ are as described above, c is 0, 1, or 2, d is 1 or 2, and c+d is 2 or 3, and wherein number of repetition of the $R^2{}_2SiO$ unit is 5 to 300, the component (B) included at an amount such that molar ratio of the hydrogen atom bonded to the silicon atom in the component (B) to the vinyl group or the allyl group in the component (A) is 0.1 to 4.0, and (C) an effective amount for curing of a platinum group catalyst.

[2] The silicone lens according to the above [1] produced by thermally curing the silicone resin in a mold at an elevated pressure.

[3] The silicone lens according to the above [1] or [2] wherein the silicone resin composition is solid at normal temperature.

[4] The silicone lens according to any one of the above [1], [2], and [3] wherein the component (A) and/or the component (B) in the silicone resin composition contains silanol group.

[5] A silicone resin composition for use in producing the silicone lens of any one of the above [1] to [4].

EFFECTS OF THE INVENTION

The present invention is capable of producing a silicone lens and an addition curing silicone resin composition for molding a silicone lens in which the composition can be produced into a lens having an excellent flexibility despite being a hard resin; the composition has high transparency and high moldability; the cured product has little surface tackiness; and the composition can be readily molded in conventional molding machines.

DETAILED DESCRIPTION OF THE INVENTION

Figure 1:
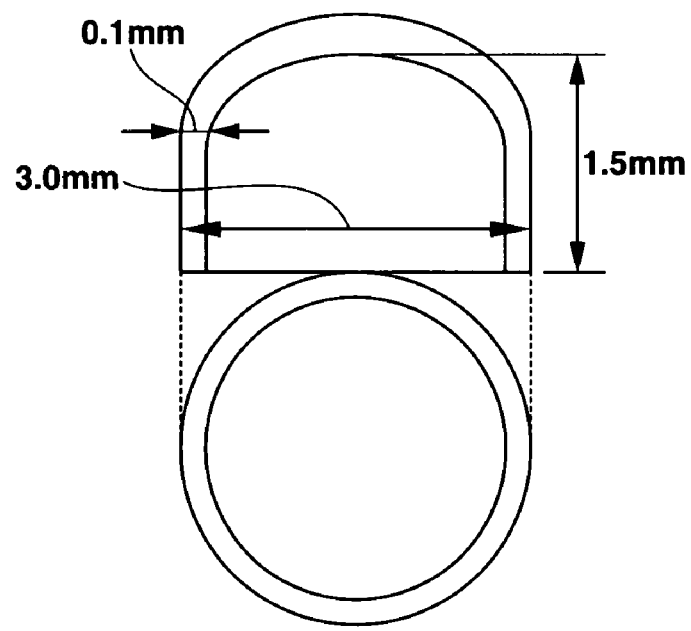
FIG. 1 is a cross-sectional view showing the shape of the cured hollow lens prepared by injection molding in Examples and Comparative Examples for evaluating physical properties.

Next, the present invention is described in further detail.

(A) Organopolysiloxane Having a Resin Structure

The organopolysiloxane having a resin structure (namely, three-dimensional network) which is an important component in the silicone resin composition of the present invention comprises the $R^1SiO_{1.5}$ unit, the $R^2_2SiO$ unit, and the $R^3_aR^4_bSiO_{(4-a-b)/2}$ unit wherein $R^1$, $R^2$, and $R^3$ are independently methyl group, ethyl group, propyl group, cyclohexyl group or phenyl group, $R^4$ is vinyl group or allyl group, a is 0, 1, or 2, b is 1 or 2, and a+b is 2 or 3. The number of repetition of the $R^2_2SiO$ unit is typically 5 to 300, preferably 10 to 300, more preferably 15 to 200, and most preferably 20 to 100. The "number of repetition of the $R^2_2SiO$ unit of 5 to 300" means that at least 50% by mole (50 to 100% by mole), and in particular, at least 80% by mole (80 to 100% by mole) of the all $R^2_2SiO$ unit in the component (A) forms a straight chain diorganopolysiloxane chain having the structure:

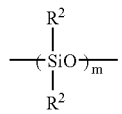

(wherein m is an integer of 5 to 300) in the molecule, and the remaining $R^2_2SiO$ unit is not involved in the straight chain structure containing 5 or more units (namely, present as individual $R^2_2SiO$ unit, or in the chain of up to 4 units).

In the organopolysiloxane, the $R^2_2SiO$ unit forms chain polymer, and introduction of the $R^1SiO_{1.5}$ unit enables branching and networking of the chain polymer. $R^4$ (vinyl group of allyl group) in the $R^3_aR^4_bSiO_{(4-a-b)/2}$ unit undergoes hydrosilylation addition reaction with the hydrogen atom (namely, SiH group) bonded to the silicon atom of the $R^3_cH_dSiO_{(4-c-d)/2}$ unit in the component (B) as will be described later to thereby form the cured product.

The molar ratio of the $R^1SiO_{1.5}$ unit, the $R^2_2SiO$ unit, and the $R^3_aR^4_bSiO_{(4-a-b)/2}$ unit constituting the component (A) is preferably (90 to 249):(75 to 9):(50 to 1), and in particular, (70 to 28):(70 to 20):(10 to 2) in view of the properties of the resulting cured product.

The component (A) is preferably the one which is solid or semi-solid having a weight average molecular weight in the range of 3,000 to 1,000,000, and in particular, 10,000 to 100,000 in view of the handling convenience and curability. The weight average molecular weight is the one calculated in terms of polystyrene by gel permeation chromatography (GPC).

The organopolysiloxane having the resin structure as described above may be synthesized by combining the compounds which are the starting materials of the units at the molar ratio as described above, and simultaneously hydrolyzing and condensing such compounds in the presence of, for example, an acid.

Examples of the starting material for the $R^1SiO_{1.5}$ unit include $MeSiCl_3$, $EtSiCl_3$, $PhSiCl_3$ (wherein Me stands for methyl group, Et stands for ethyl group, and Ph stands for phenyl group, and this also applies for the following description), propyltrichlorosilane, cyclohexyl trichlorosilane, and alkoxysilanes such as methoxy silane corresponding each chlorosilane.

Examples of the starting material for the $R^2_2SiO$ unit include

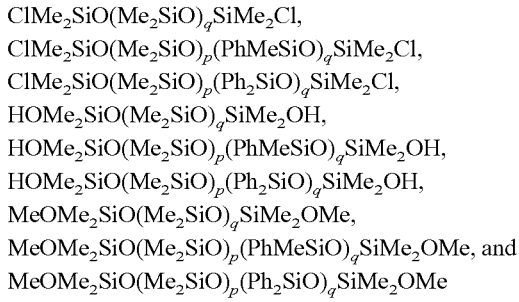

wherein p is an integer of 5 to 150, and q is an integer of 5 to 300.

The $R^3_aR^4_bSiO_{(4-a-b)/2}$ unit means any one of the combinations of the one or more siloxane units selected from $R^3R^4SiO$ unit, $R^3_2R^4SiO_{0.5}$ unit, $R^4_2SiO$ unit, and $R^3R^4_2SiO_{0.5}$ unit. Examples of the starting material include $Me_2ViSiCl$, $MeViSiCl_2$, $Ph_2ViSiCl$ (Vi stands for vinyl group, and this also applies for the following description), $PhViSiCl_2$, and alkoxysilanes such as methoxy silane corresponding each chlorosilane.

In the component (A), the $R^1SiO_{1.5}$ unit, the $R^2_2SiO$ unit and/or the $R^3_aR^4_bSiO_{(4-a-b)/2}$ unit may contain silanol group-containing units produced as byproducts in the simultaneous hydrolysis and condensation at an amount of typically up to about 10% by mole (0 to 10% by mole), and preferably up to about 5% by mole (0 to 5% by mole) in relation to all siloxane units. Examples of the silanol group-containing siloxane unit corresponding to the siloxane unit as described above include $R^1(HO)SiO$ unit, $R^1(HO)_2SiO_{0.5}$ unit, $R^2_2(HO)SiO_{0.5}$ unit, $R^3_aR^4_b(HO)SiO_{(3-a-b)/2}$ unit, and $R^3_aR^4_b(HO)_2SiO_{(2-a-b)/2}$ unit wherein a is 0 or 1, b is 1 or 2, and a+b is 1 or 2.

(B) Organohydrogen Polysiloxane Having a Resin Structure

Similarly, the organohydrogen polysiloxane having a resin structure (namely, three-dimensional network) which is an important component in the silicone resin composition of the present invention comprises the $R^1SiO_{1.5}$ unit, the $R^2_2SiO$ unit, and the $R^3_cH_dSiO_{(4-c-d)/2}$ unit wherein $R^1$, $R^2$, and $R^3$ are as defined above, c is 0, 1, or 2, d is 1 or 2, and c+d is 2 or 3. The number of repetition of the $R^2_2SiO$ unit is typically 5 to 300, preferably 10 to 300, more preferably 15 to 200, and most preferably 20 to 100. The "number of repetition of the $R^2_2SiO$ unit of 5 to 300" means that at least 50% by mole (50 to 100% by mole), and in particular, at least 80% by mole (80 to 100% by mole) of the all $R^2_2SiO$ unit in the component (A) forms a straight chain diorganopolysiloxane chain having the structure:

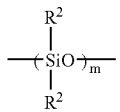

(wherein m is an integer of 5 to 300) in the molecule, and the remaining $R^2{}_2SiO$ unit is not involved in the straight chain structure containing 5 or more units (namely, present as individual $R^2{}_2SiO$ unit, or in the chain of up to 4 units).

The function of each of the $R^1SiO_{1.5}$ unit, the $R^2{}_2SiO$ unit, and the $R^3{}_cH_dSiO_{(4-c-d)/2}$ unit are as described above.

The molar ratio of the $R^1SiO_{1.5}$ unit, the $R^2{}_2SiO$ unit, and the $R^3{}_cH_dSiO_{(4-c-d)/2}$ unit is preferably (90 to 24):(75 to 9):(50 to 1), and in particular, (70 to 28):(70 to 20) (10 to 2) in view of the properties of the resulting cured product.

The component (B) is preferably the one which has a weight average molecular weight calculated in terms of polystyrene by GPC in the range of 3,000 to 1,000,000, and in particular, 10,000 to 100,000 in view of the handling convenience and curability.

The organohydrogen polysiloxane having the resin structure as described above may be synthesized by combining the compounds which are the starting materials of the units at the molar ratio as described above, and simultaneously hydrolyzing and condensing such compounds.

Examples of the starting material for the $R^1SiO_{1.5}$ unit include $MeSiCl_3$, $EtSiCl_3$, $PhSiCl_3$, propyltrichlorosilane, cyclohexyl trichlorosilane and alkoxysilanes such as methoxy silane corresponding each chlorosilane.

Examples of the starting material for the $R^2{}_2SiO$ unit include

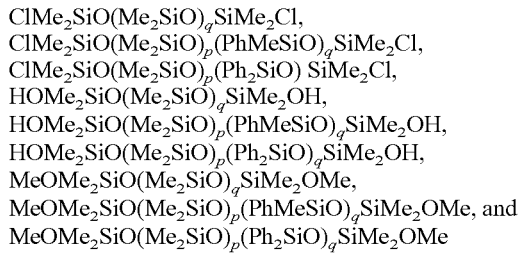

wherein p is an integer of 5 to 150, and q is an integer of 5 to 300.

The $R^3{}_cH_dSiO_{(4-c-d)/2}$ unit means any one of the combinations of one or more siloxane units selected from $R^3R^5SiO$ unit, $R^3{}_2R^5SiO_{0.5}$ unit, $R^5{}_2SiO$ unit, and $R^3R^5{}_2SiO_{0.5}$ unit. Examples of the starting material include $Me_2HSiCl$, $MeHSiCl_2$, $Ph_2HSiCl$, $PhHSiCl_2$, and alkoxysilanes such as methoxy silane corresponding to each chlorosilane. Examples of the silanol group-containing siloxane unit corresponding to the siloxane unit as described above include $R^1(HO)SiO$ unit, $R^1(HO)_2SiO_{0.5}$ unit, $R^2{}_2(HO)SiO_{0.5}$ unit, $R^3{}_cH_d(HO)SiO_{(3-c-d)/2}$ unit, and $R^3{}_cH_d(HO)_2SiO_{(2-c-d)/2}$ unit wherein c is 0 or 1, d is 1 or 2, and c+d is 1 or 2. Such silanol group-containing siloxane units may be included at a content of up to about 10% by mole (0 to 10% by mole), and preferably up to about 5% by mole (0 to 5% by mole) in relation to all siloxane units.

The organohydrogen polysiloxane may be incorporated at an amount such that molar ratio of the hydrogen atom (SiH group) bonded to the silicon atom in the component (B) to the total of the vinyl group and the allyl group in the component (A) is 0.1 to 4.0, in particular, 0.5 to 3.0, and most preferably 0.8 to 2.0. When the molar amount is less than 0.1, the curing reaction will not proceed and production of the cured product will be difficult. When the ratio is in excess of 4.0, a large amount of unreacted SiH group will remain in the cured product, and this may cause the change of the physical properties with the lapse of time.

In the component (B), the $R^1SiO_{1.5}$ unit, the $R^2{}_2SiO$ unit and/or the $R^3{}_cH_dSiO_{(4-c-d)/2}$ unit may contain silanol group produced as byproducts in the simultaneous hydrolysis and condensation at an amount of typically up to about 10% by mole (0 to 10% by mole), and preferably up to about 5% by mole (0 to 5% by mole) in relation to all siloxane units.

(C) Platinum Group Catalyst

This catalyst component is incorporated for facilitating the addition curing reaction of the composition of the present invention, and exemplary catalysts include platinum, palladium, and rhodium catalysts. In view of the cost, the preferred are platinum catalysts such as platinum, platinum black, and chloroplatinic acid, for example, $H_2PtCl_6 \cdot xH_2O$, $K_2PtCl_6$, $KHPtCl_6 \cdot xH_2O$, $K_2PtCl_4$, $K_2PtCl_4 \cdot xH_2O$, and $PtO_2 \cdot xH_2O$ wherein x is a positive integer, a complex of such platinum catalyst with a hydrocarbon such as an olefin, an alcohol, or a vinyl group-containing organopolysiloxane, which may be used alone in combination of two or more. Such catalyst component may be used at the so called "catalytically effective amount", which is typically in the range of 0.1 to 500 ppm, and most preferably 0.5 to 100 ppm in terms of the weight of the platinum group metal in relation to the total amount of the components (A) and (B).

(D) Other Additives

The composition of the present invention may optionally contain various additives in addition to the components (A) to (C) as described above which are themselves known in the art. Exemplary such additives include reinforcing inorganic fillers such as fumed silica and fumed titanium dioxide and non-reinforcing inorganic fillers such as calcium carbonate, silicic acid calcium, titanium dioxide, ferric oxide, carbon black, and zinc oxide, which may be incorporated at an amount of up to 600 parts by weight (0 to 600 parts by weight) per 100 parts by weight of the total amount of the components (A) and (B).

Also, a release agent component may be incorporated in the composition. This release agent component is the component optionally added for the purpose of removing the molded article from the mold without damaging the article after molding and curing the silicone resin composition of the present invention in a mold under elevated pressure. The properties required for such release agent include complete compatibility with the silicone resin composition, and capability of producing a colorless transparent cured article. When the lens is used for the lens of blue, white, or other LED, the lens should be not only transparent but also resistant to deterioration by irradiation with a short wavelength beam or color change at an elevated temperature.

Any desired release agent may be used as long as such requirements are satisfied, and exemplary release agents include fatty acid release agents such as RIKEMAL AZ-01, RIKEMAL B-100, RIKEMAL HC-100, RIKEMAL HC-200, RIKEMAL S-95, RIKEMAL S-200, RIKEMAL TG-12, RIKESTER EW-100, RIKESTER EW-200, RIKESTER EW-250, RIKESTER EW-400, RIKESTER EW-440A, and RIKESTER HT-10 manufactured by Riken Vitamin Co., Ltd.; polyethylene release agents such as LICOWAX PED 136, LICOWAX PED 153, and LICOWAX PED 371FP manufactured by Clariant; HOE WAX PE 130 PDR, HOE WAX PED 191 PDR, HOE WAX PE 191 PDR, HOE WAX PE 191 Flakes, and HOE WAX PE 520 Powder manufactured by Hoechst; carnauba release agents such as YTS- 040625-03, carnauba candelilla, refined granule carnauba manufactured by To a Kasei Co., Ltd.; and montanic acid ester release agents such as LICOLUBU WE40 manufactured by Clariant. Among these, fatty acid release agent are superior in view of the compatibility with the silicone resin, transparency after the curing, and resistance to color change after leaving at a high temperature.

By incorporating such release agent at an amount of typically up to 5% by weight (0 to 5% by weight), and preferably up to 0.05 to 5% by weight in relation to total amount of the components (A) and (B), the lens molded, for example, by injection molding can be readily released from the mold.

When the amount incorporated is too small, release of the molded article from the mold will be insufficient, and when the articles are consecutively molded, decline of the release property may start from about 50 shots, and cleaning of the mold may become necessary to detract from productivity.

When the amount exceeds 5% by weight, the excessively incorporated mold release agent will ooze out to the lens surface, and the lens may exhibit impaired property. The mold release agent may be added to the mixture of the main component and the curing agent, or either one of the main component and the curing agent.

The silicone resin composition of the present invention is produced by homogeneously mixing the components as described above. However, the composition is generally stored by dividing into two parts so that the curing does not proceed during the storage, and the two parts are mixed before the use of the composition. The composition, of course, can be produced in one part product by adding a small amount of curing inhibitor such as acetylene alcohol and the like in the composition.

For the improvement of the mechanical strength or adjustment of the expansion coefficient, the composition of the present invention may also have incorporated therein an antioxidant or an ultrafine silica such as aerosil known in the art, or an inorganic filler having its refractive index adjusted to the level of the cured silicone resin to the extent that does not adversely affect the transparency of the composition.

When a lens is molded by using this composition for compression molding, transfer molding, injection molding, or the like, the productivity will be improved because of the handling convenience if the powder is prepared in two part form and stored separately until its use when the separately stored parts are directly mixed in a mixing apparatus such as a blender or a screw mixer and the mixed ingredients are introduced into a molding machine for molding. The molding conditions are not particularly limited, and the in the molding, the silicon resin composition may be melted at 30 to 120° C. and cured at a temperature of 120 to 180° C. for about 30 to 300 seconds, although the conditions may vary by the curing properties of the composition.

The cured article produced by thermally curing the silicone resin composition adapted for molding a lens according to the present invention is colorless and transparent, and most preferably, the cured article has a light transmittance of at least 90% in the range of 400 nm to visible light region when measured with a spectrophotometer for a cured sheet having a thickness of 1 mm by using air for the reference.

Figure 2:
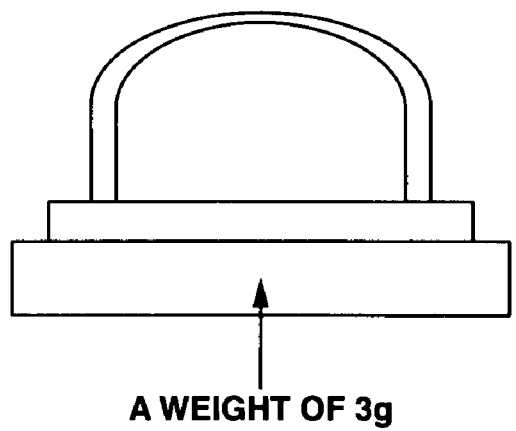
FIG. 2 is a cross-sectional view showing the shape of the lens used in Examples and Comparative Examples in drop test.

The lens is not particularly limited for its shape, and exemplary shapes include the hollow hemisphere or the dome as shown FIGS. 1 and 2, aspherical, fresnel, and side emitter shapes, and such lens is well adapted for used in LED, optical camera, CCD, CMOS, and the like.

EXAMPLES

Next, the present invention is described in detail by referring to Synthetic Examples, Examples of the present invention, and Comparative Examples, which by no means limit the scope of the present invention. In the following Examples, the viscosity is the value at 25° C., and the number average molecular weight is the value calculated in terms of polystyrene determined by gel permeation chromatography (GPC). Ph stands for phenyl group, Me stands for methyl group, and Vi stands for vinyl group.

Synthetic Example 1

27 mol of organosilane represented by $PhSiCl_3$, 1 mol of $ClMe_2SiO(Me_2SiO)_{33}SiMe_2Cl$, and 3 mol of $MeViSiCl_2$ were dissolved in toluene solvent, and the solution was added dropwise to water for simultaneous hydrolysis. After washing with water, neutralizing by washing with an alkali, and removing the water, the solvent was stripped off to synthesize a vinyl group-containing resin. This resin had a weight average molecular weight of 62,000 and a melting point of 60° C.

Synthetic Example 2

27 mol of organosilane represented by $PhSiCl_3$, 1 mol of $ClMe_2SiO(Me_2SiO)_{33}SiMe_2Cl$, and 3 mol of $MeHSiCl_2$ were dissolved in toluene solvent, and the solution was added dropwise to water for simultaneous hydrolysis. After washing with water, neutralizing by washing with an alkali, and removing the water, the solvent was stripped off to synthesize a hydrosilyl group-containing resin. This resin had a weight average molecular weight of 58,000 and a melting point of 58° C.

Synthetic Example 3

27 mol of organosilane represented by $PhSiCl_3$, 1 mol of $ClMe_2SiO(Me_2SiO)_{33}SiMe_2Cl$, and 3 mol of $Me_2ViSiCl$ were dissolved in toluene solvent, and the solution was added dropwise to water for simultaneous hydrolysis. After washing with water, neutralizing by washing with an alkali, and removing the water, the solvent was stripped off to synthesize a vinyl group-containing resin. This resin had a weight average molecular weight of 63,000 and a melting point of 63° C.

Synthetic Example 4

27 mol of organosilane represented by $PhSiCl_3$, 1 mol of $ClMe_2SiO(Me_2SiO)_{33}SiMe_2Cl$, and 3 mol of $Me_2HSiCl$ were dissolved in toluene solvent, and the solution was added dropwise to water for simultaneous hydrolysis. After washing with water, neutralizing by washing with an alkali, and removing the water, the solvent was stripped off to synthesize a hydrosilyl group-containing resin. This resin had a weight average molecular weight of 57,000 and a melting point of 56° C.

Example 1

189 g of the vinyl group-containing resin produced in Synthetic Example 1, 189 g of the hydrosilyl group-containing resin produced in Synthetic Example 2, 0.2 g of ethynylcyclohexanol (an acetylene alcohol) as a reaction inhibitor, and 0.1 g of solution of chloroplatinic acid modified with octyl alcohol were placed in a planetary mixer which had been heated to 60° C., and the mixture was fully agitated to prepare a silicone resin composition. To 100 parts by weight of this composition, 1.0 parts by weight of a fatty acid-based release agent (pentaerythritol tetrastearate, RIKESTER, EW-440A manufactured by Riken Vitamin Co., Ltd.) was added, and the mixture was fully agitated to prepare a silicone resin composition containing a release agent.

This composition was heated in an injection molding machine to 60° C., and injection molded at 150° C. for 5 minutes to produce the cured hollow lens shown in FIG. 1. The composition was also heated in the injection molding machine to 60° C., injection molded, and injection molded at 150° C. for 5 minutes to produce a cured sheet (dumbbell shape) having a thickness of 0.2 mm. The cured sheet was subjected to secondary curing (post curing) at 150° C. for 4 hours, and the resulting post cured sheet was evaluated for its tensile strength (thickness, 0.2 mm), elongation (thickness, 0.2 mm), and hardness (measured by Type D durometer) according to JIS K 6251 and JIS K 6253.

A lens having the shape of the dome shown in FIG. 2 was injection molded in the same conditions as described above and then subjected to secondary curing at 150° C. for 4 hours, and drop test was conducted by dropping this lens with a weight of 3 g attached thereto from a height of 1 m onto a vinyl chloride resin tile to check for the generation of cracks. The surface tackiness was confirmed by touching the surface with finger. The cured lens was also placed in a commercially available silver powder (average particle size 5 μm), removed from the silver powder, and then checked whether the dust (namely, the silver powder) on the surface could be removed by air. An aluminum dish (diameter, 6 cm; depth, 0.6 mm) was also filled with the resin composition, and the cured sample obtained by subjecting the resin composition to primary curing and secondary curing in the same conditions as described above was placed in a cooling and heating cycle of −50° C. to 150° C. to check for the generation of cracks. The results of the evaluation are shown in Table 1.

Heat resistance and light transmittance were evaluated by the procedure as described below. The results are shown in Table 2.

<Heat Resistance>

The lens prepared as described above was post-cured at 150° C. for 4 hours, and passed through an IR reflow furnace set to retain the peak temperature of 260° C. for 15 seconds. Change in color and shape was examined after consecutively passing the lens through the furnace 3 times.

<Light Transmittance at a Wavelength of 400 nm>

The silicone resin composition prepared in the Examples and the Comparative Example was injection molded to a test piece having a thickness of 1 mm in the same conditions as described above. The resulting test piece was post-cured at 150° C. for 4 hours, and placed in a dryer at 200° C. for the predetermined time. After removing from the dryer, it was evaluated for the light transmittance.

Example 2

189 g of the vinyl group-containing resin of Synthetic Example 3, 189 g of the hydrosilyl group-containing resin of Synthetic Example 4, 0.2 g of ethynylcyclohexanol (an acetylene alcohol) as a reaction inhibitor, and 0.1 g of solution of chloroplatinic acid modified with octyl alcohol were placed in a planetary mixer which had been heated to 60° C., and the mixture was fully agitated to prepare a silicone resin composition.

A molded and cured article was produced, and the article was subjected to secondary curing by repeating the procedure of Example 1. The article was evaluated for the mechanical properties (tensile strength, hardness, elongation), surface tackiness, resistance to cold and hot cycles, heat resistance, and light transmittance. The results are shown in Tables 1 and 2.

Example 3

189 g of the vinyl group-containing resin produced in Synthetic Example 3, 189 g of the hydrosilyl group-containing resin produced in Synthetic Example 4, 0.2 g of ethynylcyclohexanol (an acetylene alcohol) as a reaction inhibitor, and 0.1 g of solution of chloroplatinic acid modified with octyl alcohol were placed in a planetary mixer which had been heated to 60° C., and the mixture was fully agitated to prepare a silicone resin composition. To 100 parts by weight of this composition, 1.0 parts by weight of a fatty acid-based release agent (pentaerythritol tetrastearate, RIKESTER, EW-440A manufactured by Riken Vitamin Co., Ltd.) was added, and the mixture was fully agitated to prepare a silicone resin composition containing a release agent.

A molded and cured article was produced, and the article was subjected to secondary curing by repeating the procedure of Example 1, and the product was evaluated for the mechanical properties (tensile strength, hardness, and elongation), surface tackiness, resistance to cold and hot cycles, heat resistance, and light transmittance. The results are shown in Tables 1 and 2.

Synthetic Example 5

A mixture of 698 parts by weight of phenyltrichlorosilane, 169 parts by weight of methylvinyldichlorosilane, 194 parts by weight of dimethyldichlorosilane, and 530 parts by weight of toluene was added dropwise to 2500 parts by weight of water in 60 minutes with vigorous stirring. The stirring was continued for another 60 minutes, and the solution was washed with water until the solution became neutral. After the washing with water, the solution was dissolved in toluene to prepare a toluene solution having a concentration of 25%, and 0.42 parts by weight of potassium hydroxide was added. After refluxing the mixture with heating for 5 hours for polymerization, 13.8 parts by weight of trimethylchlorosilane was added, and the stirring was continued at room temperature for 60 minutes for neutralization of the alkali. The reaction mixture was filtered, and toluene was removed with heating under reduced pressure to thereby obtain transparent vinyl group-containing organopolysiloxane.

Comparative Example 1

50 parts by weight of vinylmethylsiloxane (VMQ) having a resin structure comprising 50 parts by weight of polysiloxane (VF) represented by the following formula (i):

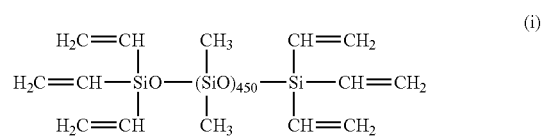

(i)

50% by mole of $SiO_2$ unit, 42.5% by mole of $(CH_3)_3SiO_{0.5}$ unit, and 7.5% by mole of $Vi_3SiO_{0.5}$ unit, and an organohydrogen polysiloxane represented by the following formula (ii):

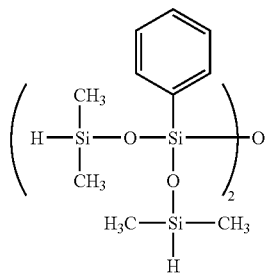

at an amount such that molar amount of the SiH group is 1.5 times that of the total amount of vinyl group in the VF and the VMQ components, and 0.05 parts by weight of solution of chloroplatinic acid modified with octyl alcohol were mixed, and the mixture was fully stirred to prepare a silicone rubber composition. A molded and cured article was produced, and the article was subjected to secondary curing by repeating the procedure of Example 1. The article was evaluated for the mechanical properties (tensile strength, hardness, and elongation), surface tackiness, resistance to cold and hot cycles, heat resistance, and light transmittance. The results are shown in Tables 1 and 2.

Comparative Example 2

100 parts by weight of the vinyl group-containing silicone produced in Synthetic Example 5 was mixed with 30 parts by weight of the organohydrogen polysiloxane represented by the following formula (ii) and 0.05 parts by weight of 1% solution of chloroplatinic acid in octyl alcohol. A molded and cured article was produced, and the article was subjected to secondary curing by repeating the procedure of Example 1. The article was evaluated for the mechanical properties (tensile strength, hardness, and elongation), surface tackiness, resistance to cold and hot cycles, heat resistance, and light transmittance. The results are shown in Tables 1 and 2.

TABLE 1

(ii)

|  | Example | | | Comparative Example | |
|---|---|---|---|---|---|
|  | 1 | 2 | 3 | 1 | 2 |
| Conditions of post-curing | 150° C. for 4 hr | 150° C. for 4 hr | 150° C. for 4 hr | 150° C. for 4 hr | 150° C. for 4 hr |
| Hardness (Type D) | 50 | 52 | 52 | 35 | 70 |
| Elongation (%) | 20 | 20 | 20 | 20 | 0 |
| Tensile strength (Mpa) | 9 | 9 | 9 | 2 | 2 |
| Drop test | Pass | Pass | Pass | Cracks generated | Cracks generated |
| Dust attachment due to surface tackiness | None | None | None | None | None |
| Thermal shock test at −50° C. to 150° C. (100 cycles) | No crack | No crack | No crack | Cracks generated | Cracks generated |

TABLE 2

|  |  | Example | | | Comparative Example | |
|---|---|---|---|---|---|---|
|  |  | 1 | 2 | 3 | 1 | 2 |
| Heat resistance |  | No color change | No color change | No color change | No color change | No color change |
| Change in light transmittance at a wavelength of 400 nm | Initial | 98% | 98% | 97% | 97% | 98% |
| | After 24 hr at 200° C. | 98% | 98% | 97% | 95% | 95% |
| | After 48 hr at 200° C. | 95% | 96% | 95% | 95% | 94% |

Japanese Patent Application No. 2006-119055 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A colorless transparent silicone lens produced by thermally curing a silicone resin composition comprising
   (A) an organopolysiloxane having a resin structure comprising $R^1SiO_{1.5}$ unit, $R^2_2SiO$ unit, and $R^3_aR^4_bSiO_{(4-a-b)/2}$ unit wherein $R^1$, $R^2$, and $R^3$ are independently methyl group, ethyl group, propyl group, cyclohexyl group, or phenyl group, $R^4$ is vinyl group or allyl group, a is 0, 1, or 2, b is 1 or 2, and a+b is 2 or 3, and wherein number of repetition of the $R^2_2SiO$ unit is 5 to 300,
   (B) an organohydrogen polysiloxane having a resin structure comprising $R^1SiO_{1.5}$ unit, $R^2_2SiO$ unit, and $R^3_cH_dSiO_{(4-c-d)/2}$ unit wherein $R^1$, $R^2$, and $R^3$ are as described above, c is 0, 1, or 2, d is 1 or 2, and c+d is 2 or 3, and wherein number of repetition of the $R^2_2SiO$ unit is 5 to 300, the component (B) included at an amount such that molar ratio of the hydrogen atom bonded to the silicon atom in the component (B) to the vinyl group or the allyl group in the component (A) is 0.1 to 4.0, and
   (C) an effective amount for curing of a platinum group catalyst.

2. The silicone lens according to claim 1 produced by thermally curing the silicone resin in a mold at an elevated pressure.

3. The silicone lens according to claim 1 wherein the silicone resin composition is solid at normal temperature.

4. The silicone lens according to claim 1 wherein the component (A) and/or the component (B) in the silicone resin composition contains silanol group.

* * * * *